INVENTOR.
GEORGE R. ASCHAUER
BY
Lieber & Nilles
ATTORNEYS

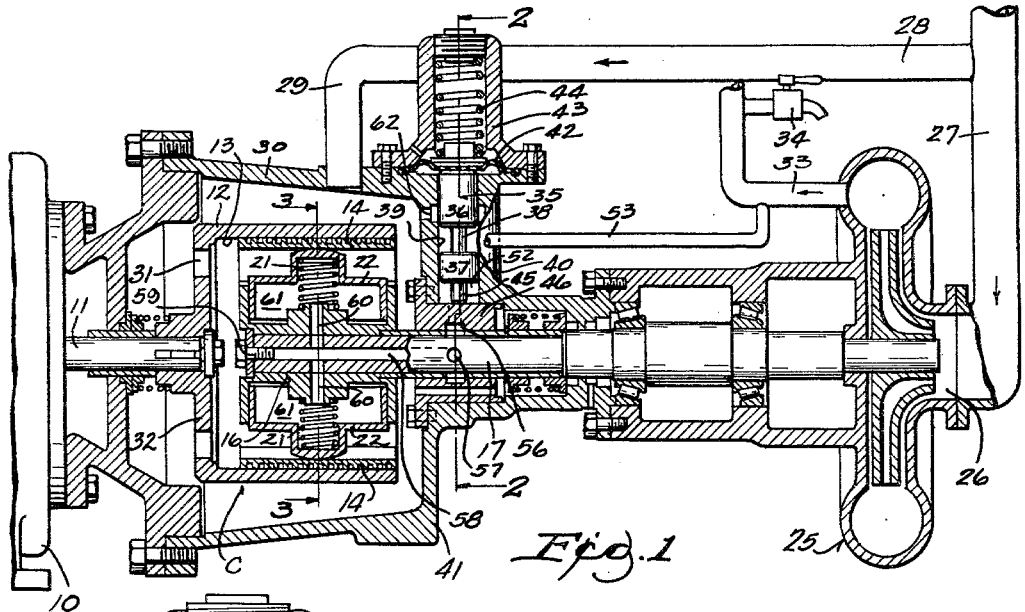

May 18, 1965  G. R. ASCHAUER  3,184,024
CENTRIFUGAL CLUTCH HAVING AN OUTPUT CONTROLLED
SUPPLEMENTARY CLUTCHING FORCE
Filed Nov. 6, 1963  4 Sheets-Sheet 3

INVENTOR.
GEORGE R. ASCHAUER
BY
Lieber & Nilles
ATTORNEYS

United States Patent Office 3,184,024
Patented May 18, 1965

3,184,024
CENTRIFUGAL CLUTCH HAVING AN OUTPUT CONTROLLED SUPPLEMENTARY CLUTCHING FORCE
George R. Aschauer, Racine, Wis., assignor to Twin Disc Clutch Company, Racine, Wis., a corporation of Wisconsin
Filed Nov. 6, 1963, Ser. No. 321,855
7 Claims. (Cl. 192—103)

The present invention relates generally to centrifugal clutches having means for providing an auxiliary clutching force in addition to the conventional centrifugal clutching force. More particularly, the invention relates to such a clutch in which that auxiliary force is regulated or controlled by the output or end result of the clutch.

In order to obtain a definite or predictable amount of clutch slip, to consequently obtain a certain output result, it is desirable, when torque is plotted against r.p.m., to have the clutch torque curve approximately the pump torque curve, for example, when driving a centrifugal pump. In accordance with the present invention, an auxiliary clutching force is provided which is added to the conventional centrifugal clutching force of the clutch, so that the clutch torque curve does rise and reach the pump torque curve. This programming of energy into a clutch is more necessary when accelerating a flywheel type load than a pump type load as above referred to.

The present invention provides a centrifugal clutch having means for producing auxiliary clutching effort, and also provides triggering means which is actuated and controlled by the output or end result of the work being performed by the clutch; this triggering means in turn serves to actuate the means for producing the auxiliary clutching effort. Consequently, the end result or output of the clutch is used as the controlling reference for the application of the auxiliary clutching effort which raises the clutch capacity up to the load demand.

Another aspect of the present invention relates to a centrifugal clutch of the above type in which the clutch "runs with the load," that is to say, the shiftable elements which transmit centrifugal force into the clutching action are on the output, that is, the driven member and not on the drive or power source member. As a result, it is possible to control or program the rate at which energy is put into the clutch because at the highest slip, the clutching force and torque are lowest. Stated otherwise, the clutch runs with the output and builds up torque as the output member's speed increases and slipping decreases. As a result, the rate of energy absorption by the friction material would be reduced at high slip speeds since the torque increases as the speed squared.

Still another aspect of the invention relates to a clutch of the above type having means for initiating clutch action to thereby cause positive commencement of clutch operation.

These and other objects and advantages of the present invention will appear hereinafter as this disclosure progresses, reference being had to the accompanying drawings, in which:

FIGURE 1 is a longitudinal, sectional view through a centrifugal clutch embodying the present invention;

FIGURE 2 is a fragmentary, sectional view taken along line 2—2 in FIGURE 1, but on an enlarged scale;

FIGURE 3 is a sectional view taken along line 3—3 in FIGURE 1, but on an enlarged scale;

Figure 4:
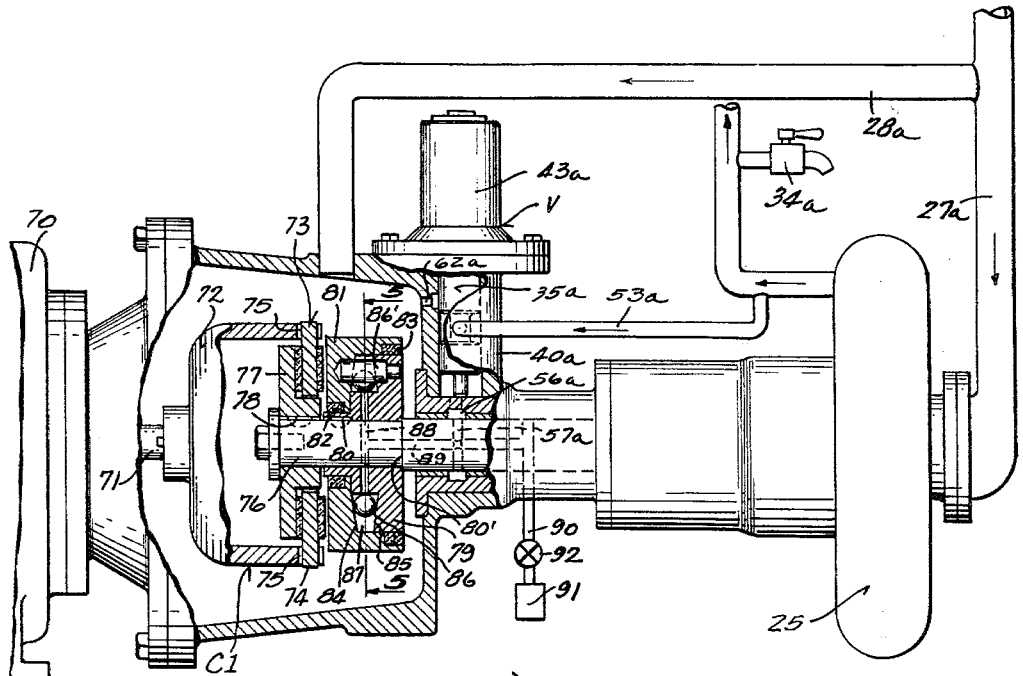
FIGURE 4 is a longitudinal, sectional view through another clutch embodying the present invention.

The present invention is applicable to various types of centrifugal clutches, and only three different embodiments have been shown for illustrating the invention.

*FIGURES 1–3*

Referring in greater detail to the FIGURES 1 to 3 form of the invention, a typical example of an automatically responsive control for fluid systems is shown, and one which serves to distribute water in a building. There are several problems inherent in a system of this type, namely, it is usually supplied by a city main in which the pressure is subject to fluctuations, the system itself may be subject to widely varying demands, and there may be situations involving both of these factors.

One known arrangement for such a system includes a motor running at constant speed and connected to a centrifugal pump for boosting the pressure in the associated system above that of the city main pressure. With all service outlets of the system closed, it is apparent that such outlets will be subjected to a pressure higher than required and while the horsepower demand is reduced to some extent, the reduction is not what it should be. Another known arrangement provides for an intermittent operation of the motor under the control of a pressure sensitive switch operably related to a tank containing air under pressure. In neither of these instances is a constant head maintained in the system.

As previously indicated, the control features of the invention are not restricted to a building water system, but are also applicable to fluid systems generally, including those of the liquid and gaseous types. This consideration stems from the use of a variable capacity, friction clutch interposed between a constant speed motor and a centrifugal pump in the case of a liquid system. The torque required to drive such a pump is proportional to the square of the pump speed and this speed can be determined under varying conditions in the liquid system by adjusting the capacity of the clutch, that is, by varying the intensity of friction contact in the clutch. The same consideration applies where the load is a fan, propeller, or an hydraulic torque converter impeller since these devices exhibit the same torque characteristic as a centrifugal pump.

A centrigual clutch C is connected to a power source, such as a motor 10, by shaft 11 which is fixed to annular shell 12 of the clutch. This shell is open at its right end (as viewed in FIGURE 1) and has an internal friction surface 13 which is frictionally engageable by the diametrically opposed clutch shoes 14. Each of these arcuately shaped shoes is pivoted at its end 15 to a hub 16 fixed to an output shaft 17. The shoes will be moved, about their pivot end 15, by centrifugal force into contact with shell surface 13 and with a force which is dependent upon the rotative speed of the hub.

Helical springs 21 constantly bias their respective shoe 14 into contact with surface 13. The springs bear at one end against the hub 16 and at their other end against a follower 22 that applies pressure to shoe 14 in a radially outward direction. Thus, these springs constitute means for initiating clutching action.

Each follower 22 is slidably and substantially sealably mounted in a complementary pocket 23 formed in the hub.

The springs 21, followers 22, shoes 14, shell 12, and hub 16 constitute the clutch C.

Output shaft 17 is connected to a driven or output member in the form of a conventional centrifugal pump 25 whose inlet 26 is supplied with water through a pipe 27 that connects with a principal supply pipe 28 for conveying water under pressure such as a city main. A pipe 29 also connects the main supply pipe 28 with the interior of a closed housing 30 within which the clutch 24 operates. The housing 30 and shell 12 are therefore always filled with water at whatever pressure then exists in the main supply pipe 28 and circulation through the shell 12 may be provided by a suitable number of apertures 31 in the end wall 32 of the shell 12. The pump 25 discharges through a pipe 33 to a faucet 34 which typify the distribution system serviced by the pump 25 and pressure variations in the latter system are utilized to control the output of the pump 25 to maintain a substantially constant pressure in the system.

As shown in FIGURES 1 and 2, a triggering means is associated with and capable of sensing the output of the clutch and is actuated and controlled by the clutch output. This triggering means includes a spool-type, control valve 35, including lands 36 and 37 spaced by a neck 38, is slidably mounted in a generally radially extending bore 39 provided in an enlarged part 40 of the housing end wall 41. The upper end of the land 36 abuts a diaphragm 42 whose periphery is clamped between the enlarged part 40 and an elongated cover 43 which houses an appropriately loaded, regulating spring 44. The spring 44 constantly loads the control valve 35 and biases it to the stop position shown in FIGURES 1 and 2 wherein a stem 45, which extends from the land 37, abuts a stationary bushing 46 that is coaxial with the shaft 17 and fits within the enlarged part 40. Bushing 46 could be formed simply as a portion of the housing end wall 41. In any event, it simply functions as a sleeve bearing and as a seal and as a member through which the pressure is conducted from a stationary part to a rotating element.

The enlarged part 40 has generally radially extending passages 47 and 48, passage 47 of which constantly communicates through an orifice 49 with the portion 50 of the bore 39 included between the lands 36 and 37 and also through a passage 51 with that portion of the bore 39 in which the stem 45 is located. The passage 47 also constantly communicates with a pipe 53 (which connects with the distribution system pipe 33, see FIGURE 1), and passage 48 via passage 54. Passage 48 connects with one end of a radial passage 55 in the bushing 46. The other end of the passage 55 connects successively through an annular channel 56 recessed in the bushing 46 and a radial passage 57 in the shaft 17 with one end of an axial passage 58 which is also located in the shaft 17. The opposite end of the passage 58 is closed by a plug 59 (FIGURE 1) and intermediately of the passage 58, opposite disposed, radially extending passages 60—60 extend through the shaft 17 and hub 16 to provide communication between the passage 58 and chambers 61—61, each chamber 61 being included between the hub 16 and associated follower 22. A discharge port 62 also connects the bore 39 through an annular channel 63 recessed in the wall of the bore with the interior of the housing 30 and, in the position of parts shown in FIGURES 1 and 2, the channel 63 is masked by the valve land 36.

Orifice 49 functions to protect the clutch from receiving the full combined pressure of the city pressure plus the pump generated pressure, and provides a pressure drop or restricted flow into the chamber 50. It will be noted the port 62 is considerably larger in area than the orifice 49 permitting the valve to regulate pressure.

Passage 55 permits the clutch pressure in chamber 50 to communicate with the clutch through the rotating shaft.

In describing the operation of the control, it is convenient to first consider the situation with all parts at rest and the usual pressure existing in the city main 28. This pressure is effective inside the housing 30, within the shell 12, the passages above referred to in the hub 16 and shaft 17, the bore portions and passages also referred to above in the enlarged part 40, the chambers 61—61, and inlet to the pump 25. Also, under the stated condition, the control valve 35 is biased by the spring 44 against the city pressure in the bore portion 52 and on the underside of the diaphragm, and to the inner or stop position shown in FIGURES 1 and 2 and wherein the land 36 masks the discharge port 62. Under this condition where port 62 is closed, clutch pressure could rise to pump generated pressure, as in the case where full capacity and speed of the pump are required.

The clutch shoes 14—14 are maintained in contact with the shell 12 by the springs 21—21 which have a starting characteristic. The intensity of contact of the clutch shoes 14—14 with the shell 12 in the rest condition, due to the springs 21—21 is such that when the motor 10 is started, the clutch shoes 14—14 slip but transmit torque to the shaft 17 sufficient to actuate the pump 25. Primary dependence is placed on the springs 21 to provide the slip condition of the clutch 24 at start and under running conditions until the fluid pressure in the distribution system attains a determined value. The water pressure in the distribution system 33 then is the summation of the city main and pump pressures, and either before or when the motor 10 attains full speed, the pressure acting on the clutch shoes 14—14 may be sufficient to force them into full torque transmitting engagement with the shell 12, this pressure being enhanced by the effect of centrifugal force on the shoes 14—14. The water pressure is also active on the underside of the diaphragm and in the bore portion 52 against the land 37 in a direction opposite to the pressure exerted by the regulating spring 44.

When the pressure in the distribution system 33 exceeds the limiting value determined by the regulating spring 44, the control valve 35 moves upwardly, as viewed in FIGURE 1, until the land 36 uncovers the annular channel 63. Accordingly, when the pressure in the distribution system 33 drops, then the clutch pressure is relieved to the housing 30 wherein the pressure is always that in the city main 28 and the water pressure in the chambers 61—61 is likewise reduced. Due to the reduced engaging pressure of the clutch 24, the latter slips and the output of the pump 25 is reduced until the pressure in the distribution system 33 falls below the regulation of the spring 44. The control valve 35 then shifts to the position shown in FIGURE 1 and the cycle is resumed.

By the use of the control, a determined pressure is substantially maintained in the distribution system 33 regardless of demand fluctuations therein. The motor 10 runs at constant speed, and the slipping clutch control of the torque transmitted to the pump 25 insures a decrease in pressure and power demand at the control point.

The centrifugally shiftable shoes 14 are carried by the output or driven member 17, and centrifugal force on these shoes provides a certain portion of the total clutching force. The initial clutching force is provided by the springs 22, and thus the clutch is capable of "bootstrapping," that is, it is self-engaging. Auxiliary clutch pressure exerting means for causing additional clutching force is provided by the fluid pressure in the system which is developed by the pump. Excessive fluid pressure in the system over a limiting value determined by the spring 44 of the triggering means causes reduced clutching force of the clutch. Thus, the output pressure of the pump due to the amount of clutching action regulates the total clutching effort.

Figure 5:
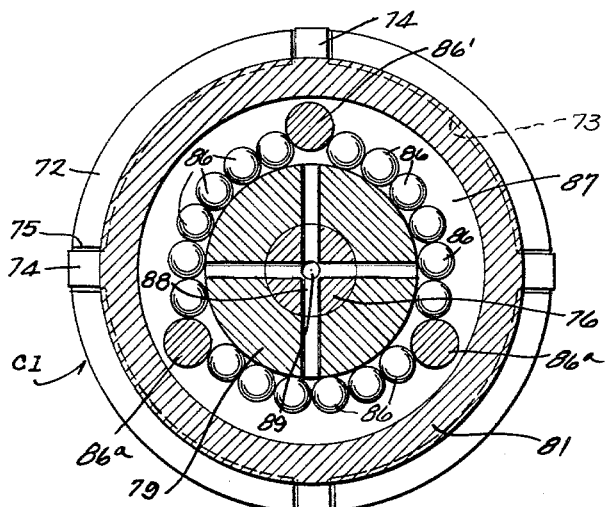
FIGURE 5 is a view taken along line 5—5 in FIGURE 4.

*FIGURES 4 and 5*

In the arrangement shown in FIGURES 4 and 5, the prime mover in the form of an engine 70 through its shaft 71 drives the cup member 72 of the clutch C1. A friction plate 73 has peripheral teeth 74 by which it is drivingly connected in the slots 75 of the cup member in the known manner. The driven shaft 76 has a back-up member 77 fixed thereto by a key 78, against which member the plate 73 abuts in the clutch engaged position. A reaction member 79 is also fixed to shaft 76 for rotation therewith by means of key 80, and is prevented from axial movement in one direction by a shoulder 80' on shaft 76.

A clamping member 81 surrounds and is axially slidable on member 79, and fluid seals 82 and 83 are interposed between these members. Members 79 and 81 have oppositely facing inclined surfaces 84 and 85, respectively, which together form cam surfaces for the series of balls 86 located therebetween. Three circumferentially spaced pins 86' extend through members 79 and 81 and insure rotation of the parts together as a unit, and as the member 81 is axially slidable on these pins, axial relative movement can occur between members 79 and 81.

A fluid chamber 87 is thus formed between members 79 and 81 which, through radial passage 88 and axial passage 89 in shaft 76, is in fluid communication with a spool-type, control valve V having a spool 35a. This triggering means, namely, the valve, its associated parts, and operation are the same as those described in FIGURES 1 to 3, and similar parts have been identified by similar reference numerals followed by the letter "a" suffix. Therefore, a detailed description of this valve and its operation is not believed to be necessary here, except as will appear later.

Clutching action of the clutch C1 occurs due to centrifugal force acting on balls 86 and urging them radially outwardly and against the cam surfaces 84 and 85, thereby causing member 81 to shift to the left (as viewed in FIGURE 4) and into the clutch engaged position when member 81 causes the friction plate 73 to bear tightly against member 77.

The balls 86 and their associated members 79 and 81 are carried by the output or driven member, that is, shaft 76.

Auxiliary clutching action is provided by introducing pressure fluid into chamber 87 via passages 88 and 89 from the control valve V. Various forms of pressure mediums may be utilized with the present clutch, such as, for example, oil, air, or water.

The operation of valve V and its associated pump is the same as described in connection with FIGURE 1, and here again the output of the clutch, that is, the pressure in the valve V, is used to control the auxiliary clutching force.

The means for initiating clutch engagement may take the form of a separate fluid conduit 90 which places a source 91 of fluid pressure in communication with chamber 87 via a valve 92. To initiate or insure clutch engagement, at the commencement of engine operation, fluid pressure may be admitted to chamber 87 from pressure source 91.

Figure 6:
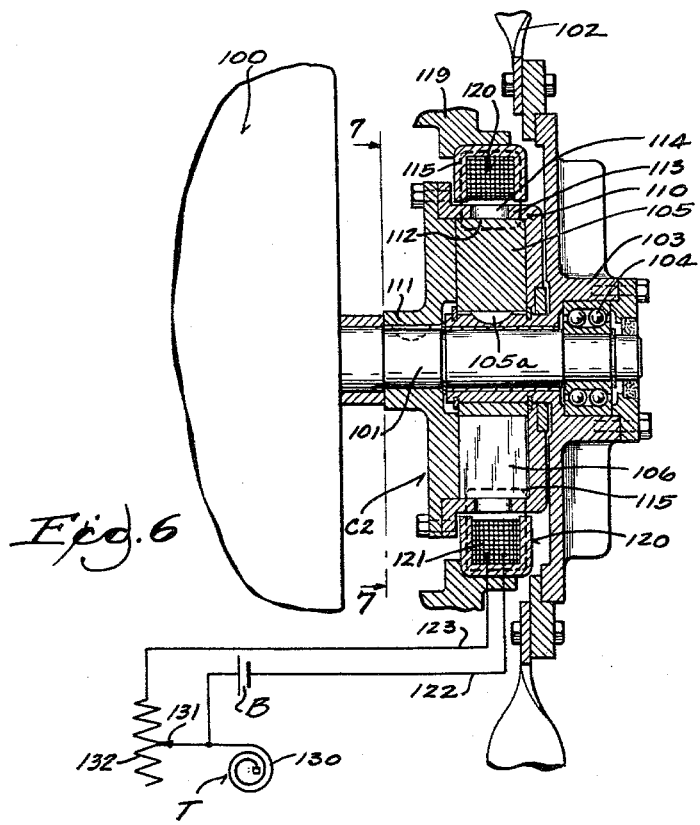
FIGURE 6 is a longitudinal, sectional view through still another clutch embodying the present invention.
Figure 7:
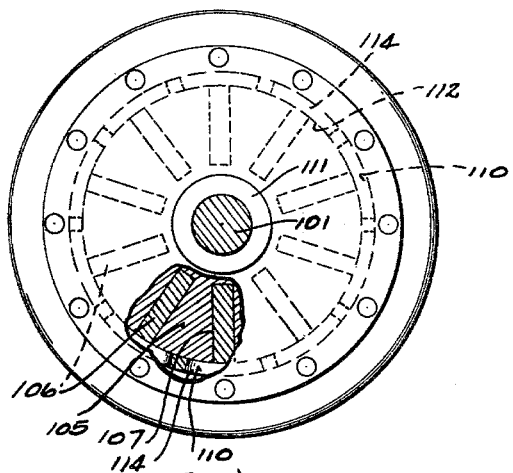
FIGURE 7 is a view taken from line 7—7 in FIGURE 6, certain parts being shown as broken away and in section for clarity.

FIGURES 6 and 7

This form of the invention has been illustrated as applied to an engine 100 of a motor vehicle which also has a fan 102 for cooling the water in the radiator (not shown) of the vehicle, and a battery B.

In this embodiment, an electro-magnetic clutch C2 is connected to a source of power, such as the engine 100, by a drive shaft 101. The output or driven member takes the form of a fan 102 which is mounted by its hub 103 and antifriction bearings 104 on the shaft 101.

A bronze rotor 105 is fixed to the fan hub by a key 105a, and a plurality of radially shiftable iron vanes 106 are slidably mounted in slots 107 of the rotor.

An iron friction cup 110 is fixed by its hub 111 to shaft 101, and vanes 106 are located within this cup for frictional engagement with the internal annular surface 112 of the cup. That is to say, the vanes are urged radially outwardly by centrifugal force, and their outer ends frictionally engage the surface 112 for driving engagement therewith.

The axial flange 113 of the cup has a series of openings 114 therearound which permit a path of flux, as indicated by 115, to pass therethrough.

The centrifugally shiftable vanes 106 are carried by the driven or output member, that is, the fan 102, and provide centrifugally actuated clutching means.

Auxiliary clutching means are provided in the form of a stationary electro-magnet 120 supported on a frame member 119 and which has a coil 121 which surrounds the cup and when energized through wires 122 and 123 from a source of energy such as the battery B sets up the previously mentioned flux path 115. This electrical field causes the vanes to be urged outwardly with an additional force and thereby causes additional clutching force or action against the cup.

The triggering means, for the above auxiliary clutching means, takes the form of a thermo-responsive means T which causes the battery B to energize the coil 121 at the appropriate time and in the proper amount. More specifically, a bimetallic element 130 is subjected to the water in the vehicle radiator (not shown), and when heated sufficiently causes the contact 131 to move across the resistance element 132 in the electrical circuit, thus decreasing the resistance and increasing the current flow from the battery to the coil. This in turn increases the attraction of the coil 121 and greater clutching action, and thereby faster operation of the fan and greater cooling effect thereof. The triggering means T always supplies some current, even though a small amount, which is the only force acting (when the pump is not rotating) to urge the blades in an outward direction.

Thus, the output or end result of the clutch, that is, the temperature of the radiator water as determined by the cooling action of the fan, is used to control or actuate the triggering means which in turn actuates the auxiliary clutching means.

As a further example of the modification to which this invention lends itself, the fan may be that in a blower of a furnace in a home, and the bimetallic thermostat may be actuated by air temperature.

Figure 8:
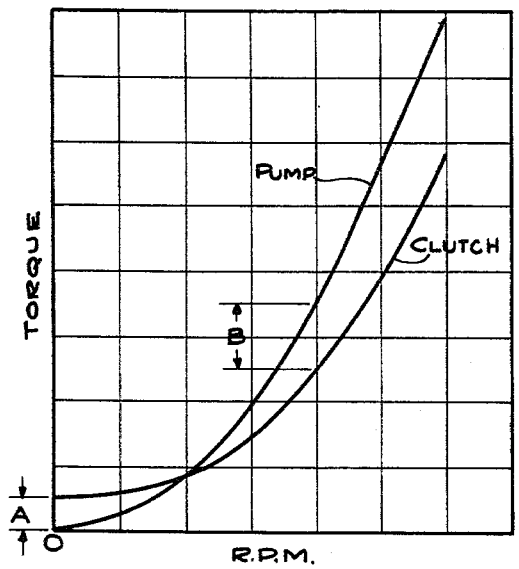
FIGURE 8 is a graph showing the relationship of characteristic curves of clutch and pump as plotted against torque and speed.
Figure 9:
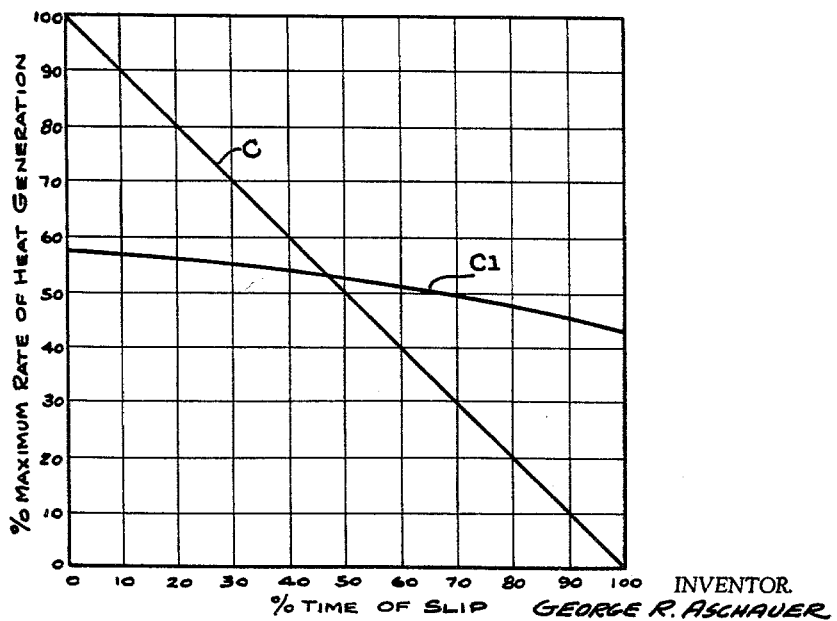
FIGURE 9 is a graph showing the curve for rate of heat generated in a conventional centrifugal clutch and in a clutch made in accordance with the present invention.

FIGURES 8 and 9

FIGURE 8 shows graphically the relationship between the curves of the pump torque and the centrifugal clutch torque (without auxiliary clutching force), when torque is plotted against speed in r.p.m. The initial torque value A in the clutch is that produced by the initiating means, for example, the springs 21 in the FIGURE 1 device.

The torque differential between the curves, as for example, the distance B at a given speed, is the approximate amount of torque which is derived due to the auxiliary clutching force. As a result, the torque curve of the clutch is raised to approximate the torque curve for the pump. By this manner of clutch modulation, by providing a certain or predictable amount of slip, it is possible to maintain the water pressure in a system at a predetermined value, to maintain an engine at a predetermined temperature, or to keep a crawler tractor, for example, at a slow ground speed with full engine speed.

FIGURE 9 shows the curve C of a conventional constant torque clutch and an approximate curve C1 of a clutch made in accordance with the present invention, when time of slip is plotted against rate of heat generated by the clutches, and when accelerating a simple flywheel type load. By "time of slip" is meant the time during which the clutch is engaging or is slipping due to actually picking up the load. It will be seen from the curve of the improved clutch that the rate of heat generation throughout the period of clutch slip is much more constant.

Recapitulation

The elements which transmit or provide the centrifugal force clutching action are all carried by the output or driven member, and this arrangement contributes to the ability of controlling or programming the torque into the clutch because when the greatest amount of slip is occurring, then the clutching froce and torque are the lowest.

An auxiliary clutching force is provided in addition to the conventional centrifugal clutching force. This auxiliary force is controlled or actuated by triggering means which in turn is actuated by the end result or output of the clutch.

Thus, the end result generated by the clutch is used as the controlling reference for the application of the auxiliary clutching force.

Various modes of carrying out the invention are contemplated as being within the scope of the following claims particularly pointing out and distinctly claiming the subject matter which is regarded as the invention.

I claim:

1. A centrifugal friction clutch comprising, centrifugally actuated friction-type clutching means capable of slipping action when engaged, auxiliary clutching force exerting means operatively connected with said centrifugally actuated clutching means for causing additional clutching force, and triggering means connected with said auxiliary means and being capable of adding energy to the auxiliary clutching force exerting means so as to cause the latter to further engage the centrifugally actuated friction type clutching means, said triggering means being associated with and capable of sensing the output of said clutch for actuation and control thereby.

2. A centrifugal friction clutch comprising, an input drive member and a driven output member, said members having centrifugally actuated friction-type clutching means including shiftable elements carried by said driven output member for frictional and slipping engagement with said input member, auxiliary clutching force exerting means for causing said elements to engage with additional clutching force, and triggering means connected with said auxiliary means and being capable of adding energy to the auxiliary clutching force exerting means so as to cause the latter to further engage the centrifugally actuated friction type clutching means, said triggering means being connected with and controlled by the output of said clutch.

3. A centrifugal friction clutch comprising, an input drive member and a driven output member, said members having centrifugally actuated friction-type clutching means including shiftable elements carried by said driven output member for frictional and slipping engagement with said input member, auxiliary clutching force exerting means for causing said elements to engage with additional clutching force, triggering means connected with said auxiliary means and being capable of adding energy to the auxiliary clutching force exerting means so as to cause the latter to further engage the centrifugally actuated friction type clutching means, said triggering means being connected with and controlled by the output of said clutch, and means for initially shifting said shiftable elements prior to rotation of said output member to thereby initiate clutching action of the clutch.

4. An electro-magnetic centrifugal clutch comprising, an input drive member and a driven output member, radially shiftable vanes carried by said driven member and urged by centrifugal force into frictional engagement with said drive member, electro-magnetic means for urging said vanes against said drive member to thereby exert an auxiliary clutching force, a source of electrical energy connected to said electro-magnetic means, adjustable means for varying the energy put into said electro-magnetic means from said source, and triggering means capable of sensing the output of said clutch and connected with said adjustable means for actuation thereof.

5. An electro-magnetic centrifugal clutch comprising, an input drive member and a driven output member, centrifugally actuated clutching means between said members including radially shiftable vanes carried by said driven member and urged by centrifugal force into frictional engagement with said drive member, an electro-magnetic coil around said drive member for urging said vanes against said drive member to thereby exert an auxiliary clutching force, a source of electrical energy connected to said coil, adjustable means for varying the energy put into said coil from said source, and thermo responsive triggering means connected with said adjustable means for actuation thereof, said triggering means being operatively associated with the output of said clutch so as to be actuated thereby.

6. A centrifugal friction clutch comprising, an input drive member and a driven output member, said members having centrifugally actuated friction-type clutching means of the friction type including shiftable elements carried by said driven output member for engagement with said input member, fluid pressure operated auxiliary means connected with and for causing said elements to engage said input member with additional friction clutching force, and control valve means in fluid communication with said auxiliary means and being capable of adding energy to the auxiliary clutching force exerting means so as to cause the latter to further engage the centrifugally actuated friction type clutching means, said control valve means being associated with and sensitive to the output of said clutch.

7. A centrifugal clutch as defined in claim 6 including means for initially shifting said shiftable elements prior to rotation of said ouput member to thereby initiate clutching action of the clutch.

References Cited by the Examiner
UNITED STATES PATENTS

| | | | |
|---|---|---|---|
| 2,214,901 | 9/40 | Griffin | 192—103 X |
| 2,286,585 | 6/42 | Simpson. | |
| 2,723,738 | 11/55 | Pesek. | |
| 2,811,956 | 11/57 | Lauck. | |
| 3,155,040 | 11/64 | Shurts et al. | 192—85 X |

DAVID J. WILLIAMOWSKY, *Primary Examiner.*